United States Patent
De Blasis et al.

(10) Patent No.: US 7,549,227 B2
(45) Date of Patent: Jun. 23, 2009

(54) DEVICE FOR REMOVAL OF FOOD PITS

(75) Inventors: Thomas J. De Blasis, Portland, OR (US); Michael Laskowski, Pittsburgh, PA (US); Lorcan Geraghty, Yonkers, NY (US)

(73) Assignee: Helen of Troy Limited, St. Michael (BB)

( * ) Notice: Subject to any disclaimer, the term of this patent is extended or adjusted under 35 U.S.C. 154(b) by 433 days.

(21) Appl. No.: 11/494,028

(22) Filed: Jul. 27, 2006

(65) Prior Publication Data

US 2008/0022532 A1    Jan. 31, 2008

(51) Int. Cl.
*A47J 25/00* (2006.01)
(52) U.S. Cl. ..................... 30/113.2; 30/113.3
(58) Field of Classification Search ............... 30/113.1, 30/113.2, 113.3
See application file for complete search history.

(56) References Cited

U.S. PATENT DOCUMENTS

| | | | |
|---|---|---|---|
| 169,034 A | 10/1875 | Pollard | |
| 688,065 A | 12/1901 | Crandall | |
| 719,131 A | 1/1903 | Parker | |
| 741,194 A | 10/1903 | Von Uffel | |
| 1,171,546 A | 2/1916 | Schnee | |
| 1,178,684 A * | 4/1916 | Shimoda | 30/113.2 |
| 1,357,377 A | 11/1920 | Brand | |
| 1,390,977 A | 9/1921 | Behr | |
| 1,421,333 A | 6/1922 | Wilcox | |
| 1,432,012 A | 10/1922 | Barndt | |
| 1,509,190 A | 9/1924 | Cook | |
| 2,097,756 A | 11/1937 | Brown | |
| 2,116,325 A * | 5/1938 | Rogers | 99/508 |
| 2,463,854 A | 3/1949 | Cowan | |
| D157,981 S | 4/1950 | Kaveney | |
| 3,731,615 A | 5/1973 | Margaroli et al. | |
| D265,539 S | 7/1982 | Pavelka | |
| 4,896,649 A | 1/1990 | Rabenecker | |
| D330,833 S | 11/1992 | Cheung | |
| 7,080,454 B2 * | 7/2006 | Holcomb et al. | 30/114 |

* cited by examiner

*Primary Examiner*—Hwei-Siu C Payer
(74) *Attorney, Agent, or Firm*—Seyfarth Shaw LLP

(57) ABSTRACT

A kitchen utensil for removing a hard center from a food item, such as a seed or a pit from a cherry or olive, has a shield for controlling a splatter of juice or other debris that may result from the removal of the hard center. The shield is removably securable with the utensil so that cleaning is simplified and so that the kitchen utensil can be stored in a compact arrangement. The shield secures on a first portion of the utensil in an operational configuration, and is received on a different portion of the utensil in a storage configuration. The utensil may include a locking mechanism to hold the utensil in a closed position so that the storage configuration is further compact.

13 Claims, 16 Drawing Sheets

DEVICE FOR REMOVAL OF FOOD PITS

FIELD OF THE INVENTION

The invention relates to a device for removing a pit or seed from an item of food and, in particular, to a device such as a cherry pitter having a removable and storable splatter shield.

BACKGROUND

Currently, devices for removing a hard center from a soft food item are well-known. Typically, the hard center is a seed, referred to as a pit, and the soft food item may be a variety of foods, such as a cherry or an olive. The food typically has a relatively tough exterior of skin that surrounds a somewhat softer flesh, and the pit is located in the approximate center of the flesh portion. For a variety of reasons, it is desired to simply and quickly remove the pit from the flesh prior to consumption.

It is particularly desirable to remove the pit while maintaining the food item in its basic shape. That is, cherries may be used as a drink garnish, as part of a salad, or in a fruit pie or cake. For each of these, it is desired that the cherry be whole, with the exception of the removed pit. Moreover, due to the nature of the devices used to remove the pits, it is often easiest to remove the pit while minimizing the damage to the rest of the food item.

These devices are referred to as pitters, and food items from which the pit has been removed are referred to as pitted, the process of removal being known as pitting. In a basic form, a pitter includes a receptacle or holding portion for supporting the food item prior to pitting. A second portion, often in the form of an elongated plunger, is driven from a first side of the food item, through a first side portion of the skin, and through the flesh until the plunger contacts the pit. The plunger is then driven further so that the pit is forced through flesh on the opposite side from the plunger and through the skin portion on a second skin side portion opposite from the first skin side portion.

Because the food item may be covered with the somewhat tough skin, and the relatively large pit is forced through the skin from the inside, it is not uncommon for a splatter to occur as the pit exits the food item. That is, the faster the pitting operation, the more force present when the pit bursts through the second skin side portion. As the pit bursts through, it is common for debris, such as juice from the food item, as well as small particles of the soft flesh or the skin, to be projected from the food item.

Some attempts have been made to control the amount and direction of the splatter, and to control the direction of the ejected or expelled pit. While some of these attempts include using a splatter shield, such have suffered from not being removable and storable.

Accordingly, there has been a need for an improved device for removing a hard center or pit from a soft food item.

SUMMARY

In accordance with an aspect of the present invention, a kitchen utensil and a splatter shield member are disclosed, the kitchen utensil being used for removing a central hard portion from a soft portion of a food item, such as a cherry or an olive. The kitchen utensil includes a holding portion for holding the food item in a placing position for removal of the hard portion, and a plunger drivable from a first side of the placing position through the soft portion and into contact with the hard portion to expel the hard portion from the soft portion while the food item is in the placing position. The shield member is removably securable with the kitchen utensil proximate a second side of the placing position generally opposite from the first side, and extends away from the placing position to control debris, such as juice or flesh, resulting from removal of the hard portion. The holding portion may include a cup-like surface with a generally central hole through which the hard portion is expelled.

The plunger may be an elongated rod-like member. The rod-like member may have a leading portion with structure for piercing the soft portion of the food item. The plunger may extend from a plunger handle, and the plunger handle may be movable towards the holding portion to drive the plunger into the food item. The holding portion may be located on a holder handle, and the plunger handle and holder handle may be pivotable relative to each other to permit the plunger to move toward and away from the holding portion. The plunger handle and holder handle may also be pivotally attached with each other.

The holding portion may include a holding surface at least partially bounding a generally central opening through which the hard portion is expelled, and the plunger may be movable so that at least a portion thereof is located within the central opening. The holding portion may have a holding side for the placing position, and a side opposite the holding side to which the shield member is releasably securable.

The kitchen utensil may have retention structure cooperable with the shield member to releasably secure the shield member and kitchen utensil. The retention structure may include threads, and the shield member may include mating threads permitting the shield member to be threadably connected with the kitchen utensil. The kitchen utensil and shield member may alternatively be releasably securable with a bayonet connection.

The shield member may be releasably securable with the kitchen utensil in a use or operational configuration for removal of the hard center, and the shield member may be storable with the kitchen utensil in a storage configuration when the kitchen utensil is not in use. A shield retainer may also be provided for storing the shield member in the storage configuration. The shield retainer may be positioned to provide a storage space between the shield retainer and the holding portion, the shield member being located in the storage space in the storage configuration. The shield retainer may have a retainer surface against which the shield member is located in the storage configuration, the retainer surface generally facing the holding portion. The retainer surface may be located substantially between the plunger and the holding portion. The kitchen utensil and shield member may have respective structures which mate when the shield member is in the storage configuration.

The plunger may extend from a plunger handle, the holding portion may be located on a holder handle, the plunger handle and holder handle may be pivotable relative to each other to permit the plunger to move toward and away from the holding portion to drive the plunger into the food item, and in the storage configuration the shield member may be positioned between the shield retainer and the holding portion, and the plunger handle and holding handles may be pivoted toward each other so that the plunger extends through the shield member to retain the shield member with the kitchen utensil.

The kitchen utensil may include a lock mechanism for locking the kitchen utensil in a storage configuration. The kitchen utensil may include grip portions on the kitchen utensil, the grip portions being formed of soft resilient material.

In another aspect of the invention, a shield for use with a kitchen utensil for removing a central hard portion from an outer soft portion of a food item is disclosed. The shield includes an engagement end having engagement structure thereon for removably securing the shield with the kitchen utensil, an exit end, and a passage between the engagement end and the exit end so that the passage provides for control of debris resulting from removal of the hard portion.

DETAILED DESCRIPTION

Figure 14:
FIG. 14 is a side elevational view of the device of FIG. 1 in a locked configuration and the shield in a stored position.

Referring initially to FIG. 14, a utensil 10 for removing a hard center portion from a food is depicted with a shield 20 removably attached thereto for controlling the ejection or expulsion of the hard center and any resulting splatter from such expulsion. The shield 20, shown as being formed of a clear plastic, is removably attached to a carrier portion 30 in an operational configuration so that it can be stored with the carrier portion 30 and the utensil in a stored configuration (FIG. 14). More specifically, the utensil 10 includes a locking mechanism 32 having an unlocked position (FIG. 4) corresponding to the operational configuration and having a locked position (FIG. 14) corresponding to a locked configuration for storing the utensil 10. In the operational configuration, the shield 20 is attached to the carrier portion 30 for controlling splatter, for instance, while in the locked configuration the shield 20 is stored with the carrier portion 30 (FIG. 14).

The carrier portion 30 includes a holding portion or receptacle 34 for receiving and supporting a food item thereon. The receptacle 34 includes a seat surface 36, which may be cup-shaped, frusto-conical, or arcuately inwardly tapering, for instance. The seat surface 36 has a central throughbore 38 and provides a placing position for the food item thereon. The food item is placed in the receptacle 34 so that an entrance side of the food item is positioned away from the seat surface 36 and an exit side of the food item is positioned over the central throughbore 38. The utensil 10 includes a plunger 40 which has a first position generally away from the food item positioned on the seat surface 36 and is advanceable from the first position towards and through the food item to expel a hard center therefrom.

The food item typically may be somewhat round or oblong shaped, may have the hard center or pit surrounded by a soft flesh portion, and may be covered in an outer skin that is tough in comparison to the flesh portion. The plunger 40 is an elongated rod-like member having a driving tip 42 for piercing the skin and driving the pit through the food item from the center and out the exit side thereof. The tip 42 includes a recess 44 (FIG. 4) contacting the pit and serving to retard the pit from being deflected to a side of the plunger 40 during operation. Surrounding the recess 44 is a number of cutting points 46 for piercing the entrance side of the food item, each of the cutting points 46 being separated by a channel 48 to allow easier penetration and advancement of the plunger 40 into the food item.

Removal of the pit from the food item commonly results in a splatter. The plunger 40 drives the pit from the food item, specifically through the exit side portion of the food item skin, and debris such as juice and small particles of the soft flesh are projected from the opening formed by the pit being forced through the skin. When the pitting is performed quickly, the pit will essentially burst quickly through the skin exit portion, causing juice and flesh to project therefrom. The pit is driven by the plunger 40 into and through the throughbore 38 so that the splattering projects into and beyond the throughbore 38 and into a bottom side 62 of the carrier portion 30.

Figure 4:
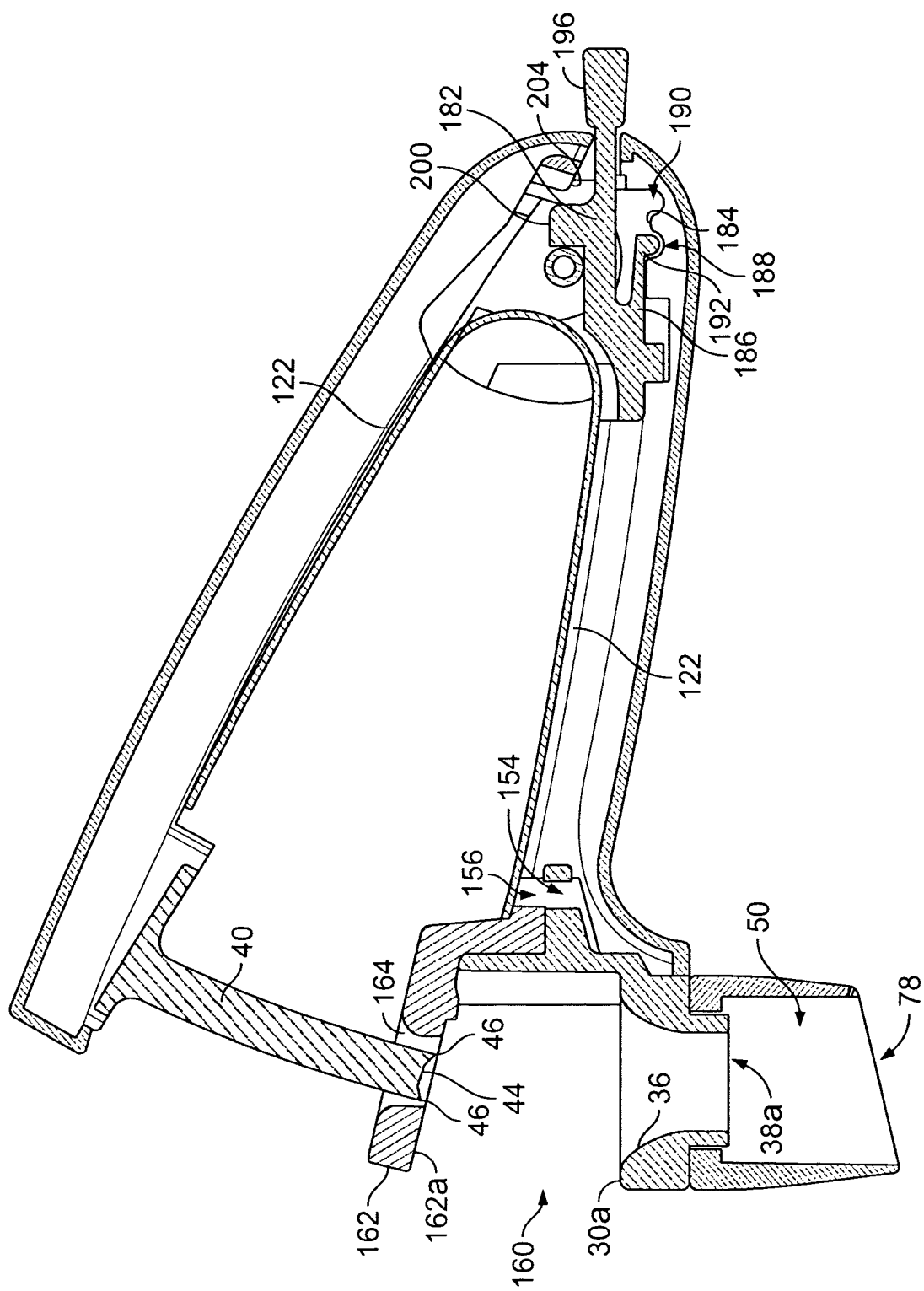
FIG. 4 is a cross-sectional view of the device and shield of FIG. 1 showing a lock mechanism in an unlocked position for the operational configuration.
Figure 5:
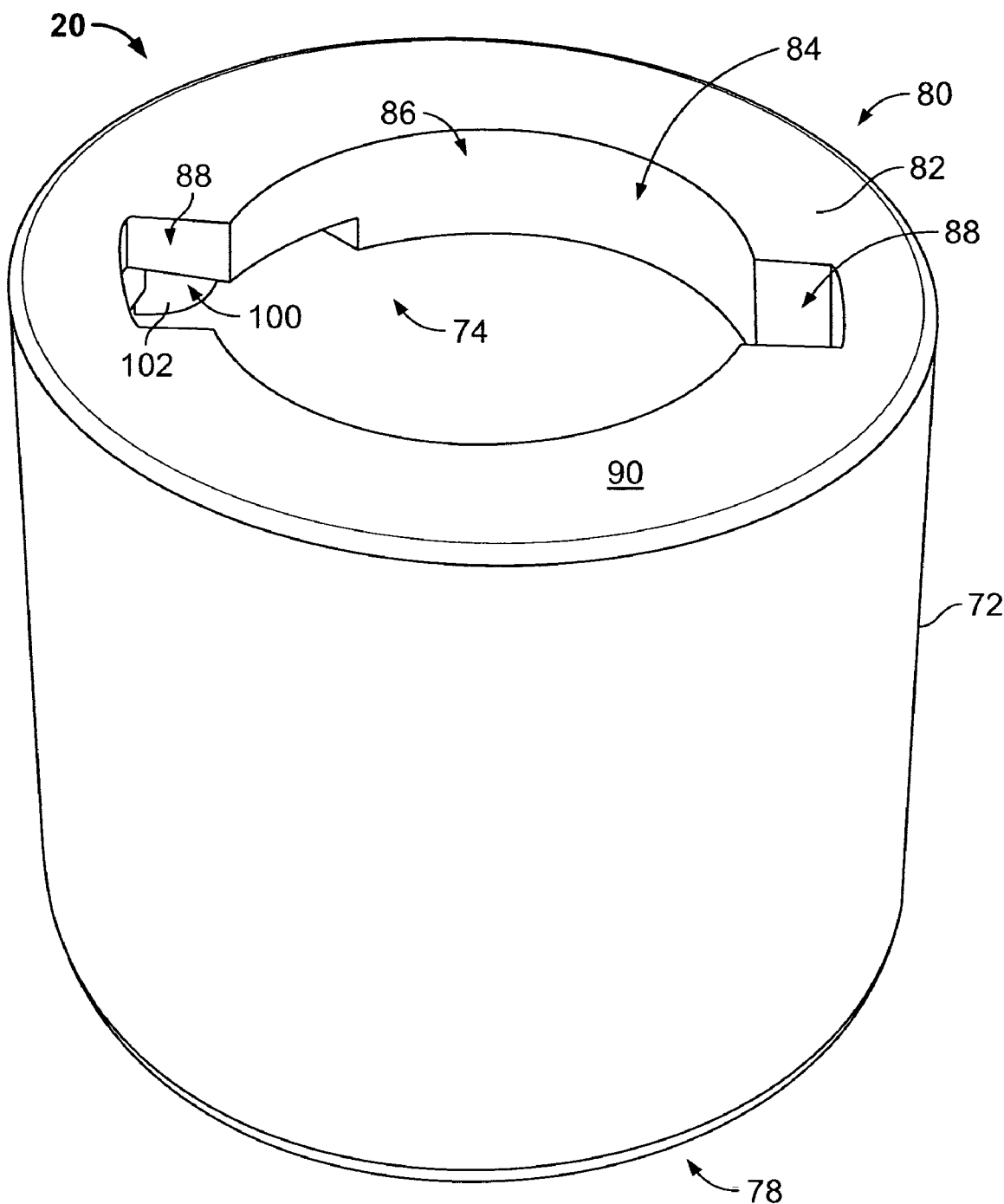
FIG. 5 is an enlarged perspective view of the shield of FIG. 1 showing a top side and opening therein for receiving and engaging with the carrier portion of the device.
Figure 6:
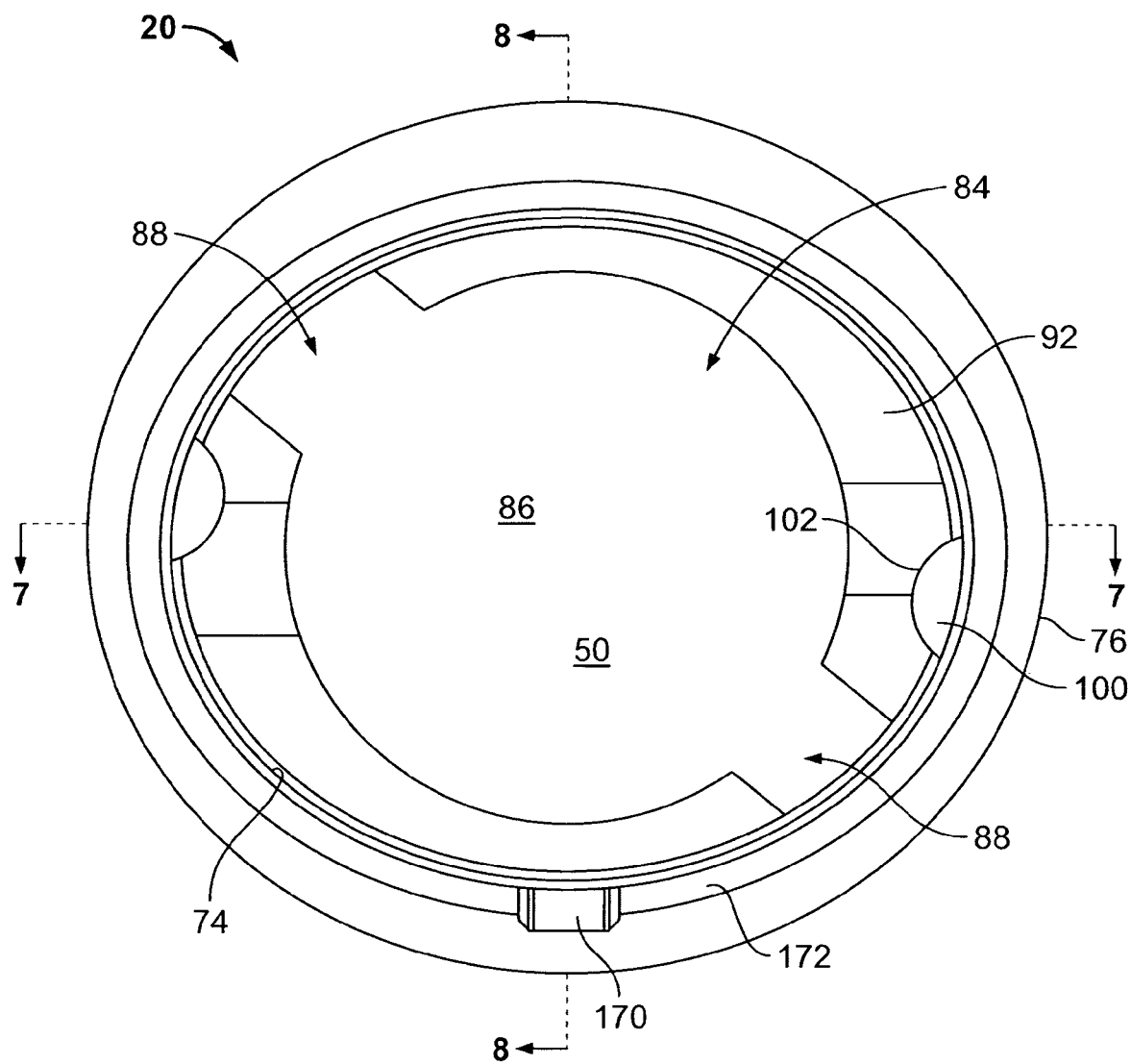
FIG. 6 is a bottom view of the shield of FIG. 5 showing an interior cavity providing passage for an ejected or expelled center portion of the food item, and showing engagement structure for securing with the carrier portion in the operational configuration.

The shield 20 serves to control the direction of the splattering and the pit ejection. The shield 20 includes a central cavity or passage 50 which, in the operational configuration, is positioned below and around a lower opening 38a of the throughbore 38, as best seen in FIG. 4.

The shield 20 is secured with the carrier portion 30 so that the shield 20 may be located on the carrier portion 30 during use, in the operational configuration. Additionally, the shield 20 is removable to simplify cleaning of it and of the utensil 10, and so that the shield 20 and utensil 10 may be stored in a compact, locked configuration, as shown in FIG. 14. Toward this end, the shield 20 and the carrier portion 30 are each configured for removably securing and retaining the shield 20 on the carrier portion 30 in the operational configuration, and for storing the shield 20 with the utensil in the storage or locked configuration.

For retaining the shield 20 on the carrier portion 30 in the operational configuration, respective engagement structures are provided. In a first form, the shield 20 and carrier portion 30 have a push-and-turn or bayonet connection, best seen in FIGS. 2 and 5-11. The carrier portion 30 includes a cylindrical projection 60 extending from the bottom side 62 thereof so that an upper shoulder 64 is formed around the projection 60 (see FIG. 3). Tabs 66 extend radially from the sides of the projection 60, the tabs 66 being positioned a short distance away from the shoulder 64 so that there is a space between the tabs 66 and the shoulder 64. The shield 20 is configured to received the projection 60 and tabs 66 therewithin.

In greater detail and with reference to FIGS. 5-8, the shield 20 includes a cylindrical body 72 having an inner surface 74 defining the passage 50 and an outer surface 76. The passage 50 includes an exit 78 from which the pit and the splattering is allowed to pass. Opposite the exit 78 is a retaining end 80 with which the carrier portion 30 secures for using the shield 20 in the operational configuration.

The retaining end 80 includes a wall 82 generally transverse to the passage 50. The wall 82 includes an opening 84 having a center portion 86 for receiving the carrier portion cylindrical projection 60, and side slots 88 for allowing the projection tabs 66 to pass through the wall 82. The wall 82 has a first side 90 that, when secured with the carrier portion 30, is generally flush against the carrier portion shoulder 64, and a second side 92 oriented within the passage 50.

The projection 60, tabs 66, and wall 82 are configured to retard separation of the carrier portion 30 and shield 20. The carrier portion projection 60 and tabs 66 are inserted from the first side 90 of the wall 82 and then rotated so that the tabs 66 are positioned against the second wall side 92. The second wall side 92 has a cam or ramp portion 94 positioned proximate each slot 88 in the direction of rotation. The tabs 66 are inserted into the slots 88, and the shield 20 is rotated so that the ramps 94 advance the shield 20 and carrier portion 30 toward each other to that the wall 82 is closely received between a top surface 66a (FIG. 10) of the tabs 66 and the shoulder 64 of the carrier portion 30. The second wall side ramps 94 lead to a flat portion 96 generally orthogonal to the direction of insertion by the projection 60 into the shield 20 and, once the projection 60 and tabs 66 are fully received within the shield 20 by sliding along the ramp portion 94, the tabs 66 are rotatably shifted away from the slots 88 and positioned on the flat portion 96.

Figure 7:
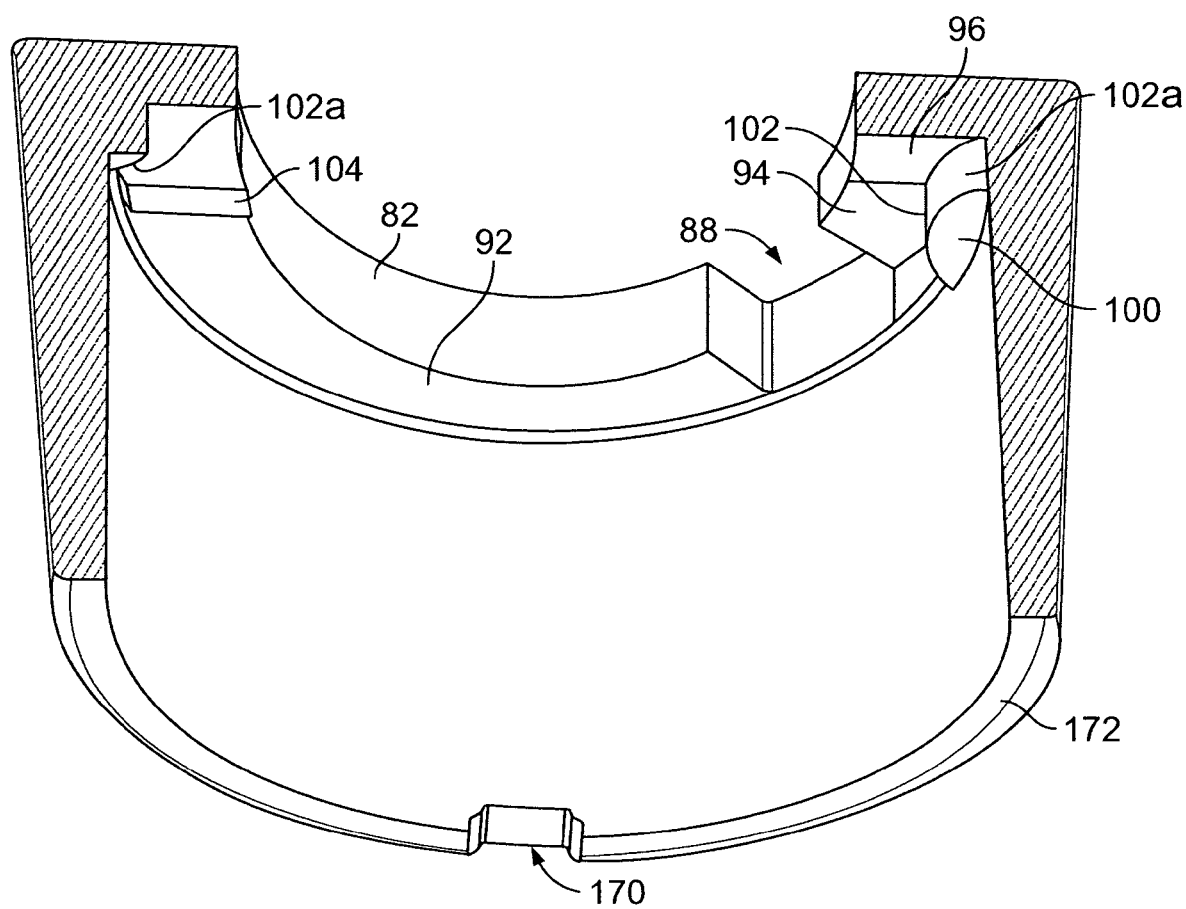
FIG. 7 is a cross-section of the shield taken along the line 7-7 in FIG. 6 and shown in perspective illustrating the engagement structure.
Figure 8:
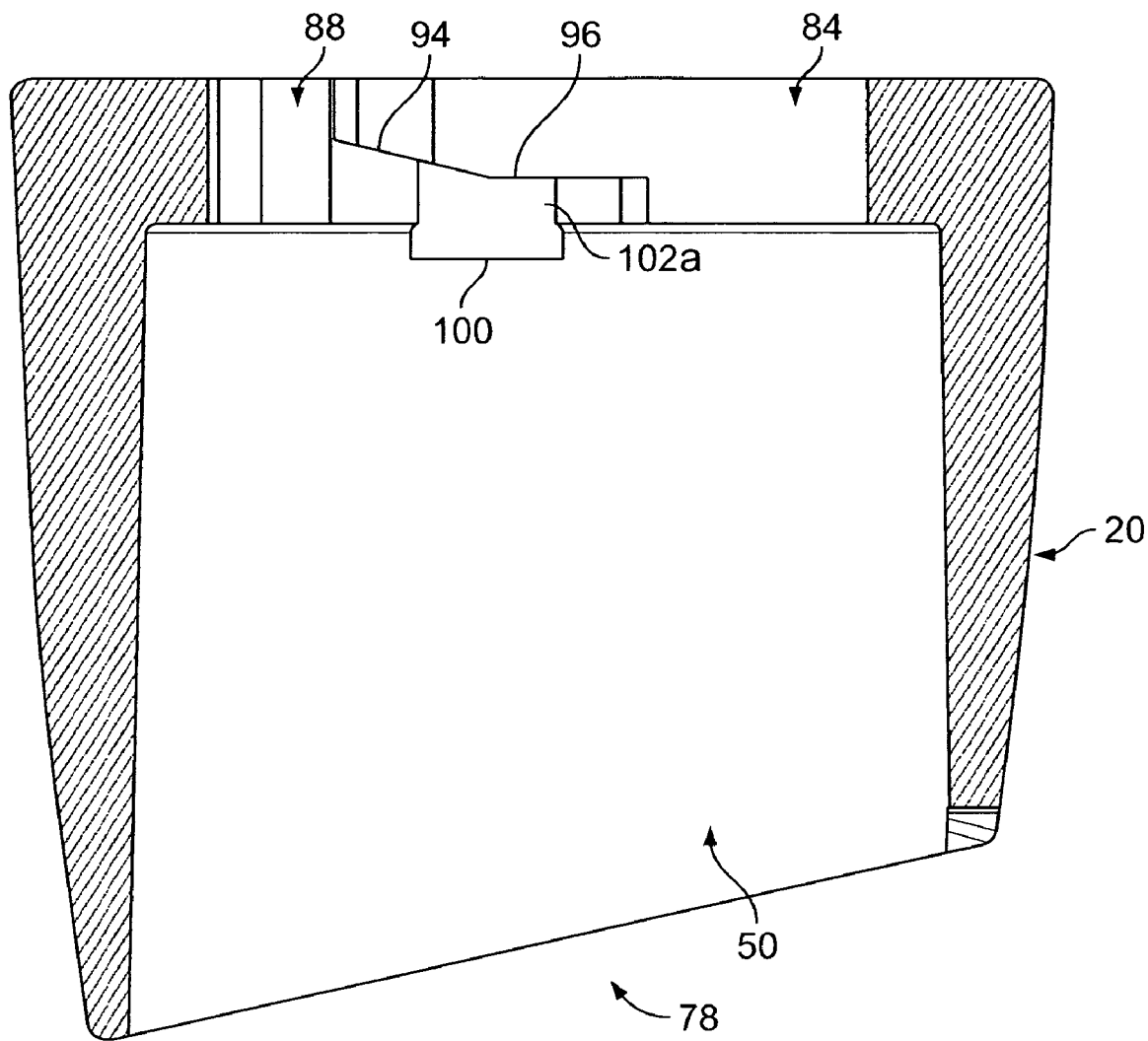
FIG. 8 is a cross-sectional view of the shield taken along line 8-8 of FIG. 6 and showing the engagement structure.
Figure 9:
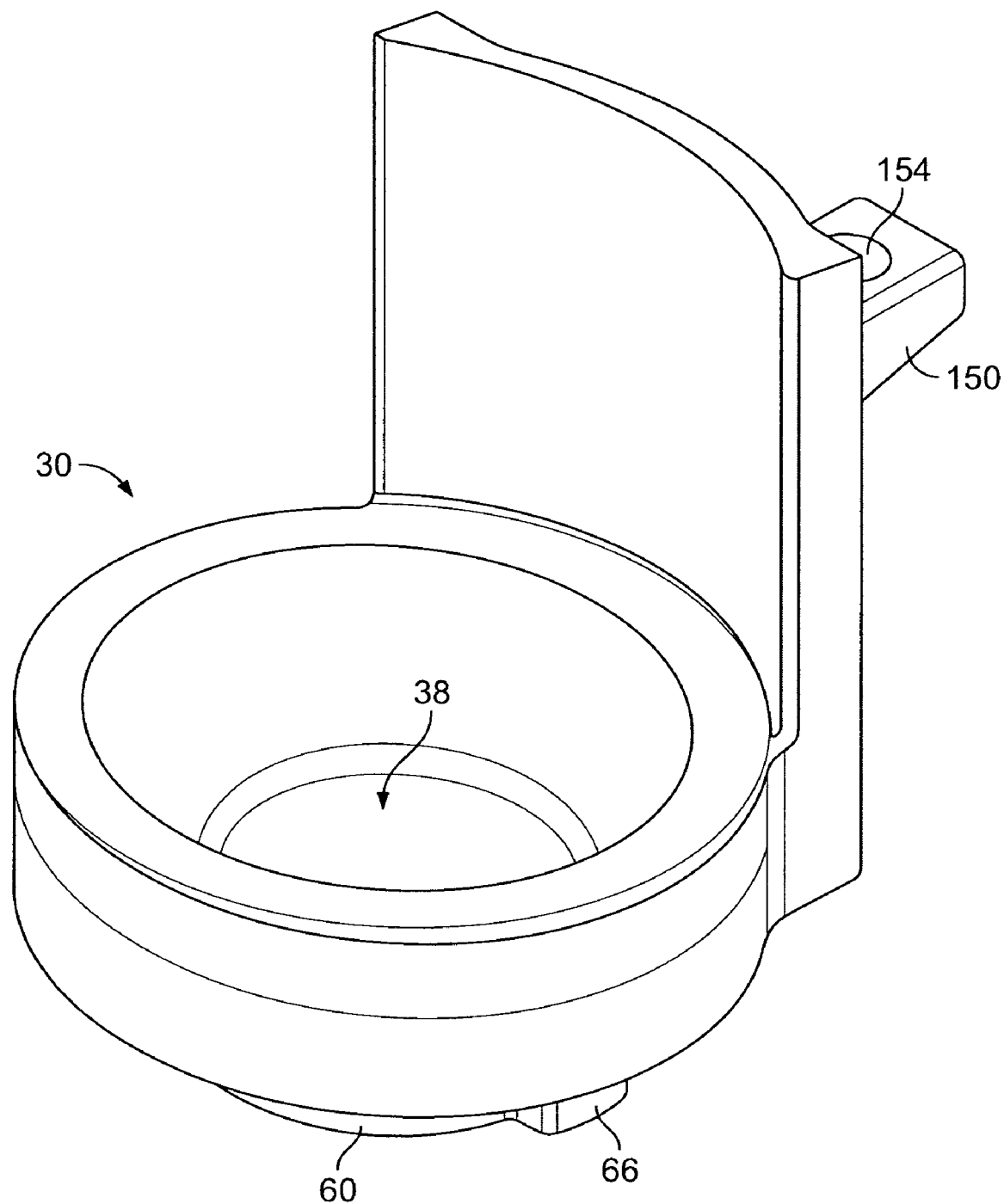
FIG. 9 is an enlarged perspective view of the carrier portion of the device of FIG. 1 showing a receptacle or holding portion for receiving the food item therein.
Figure 10:
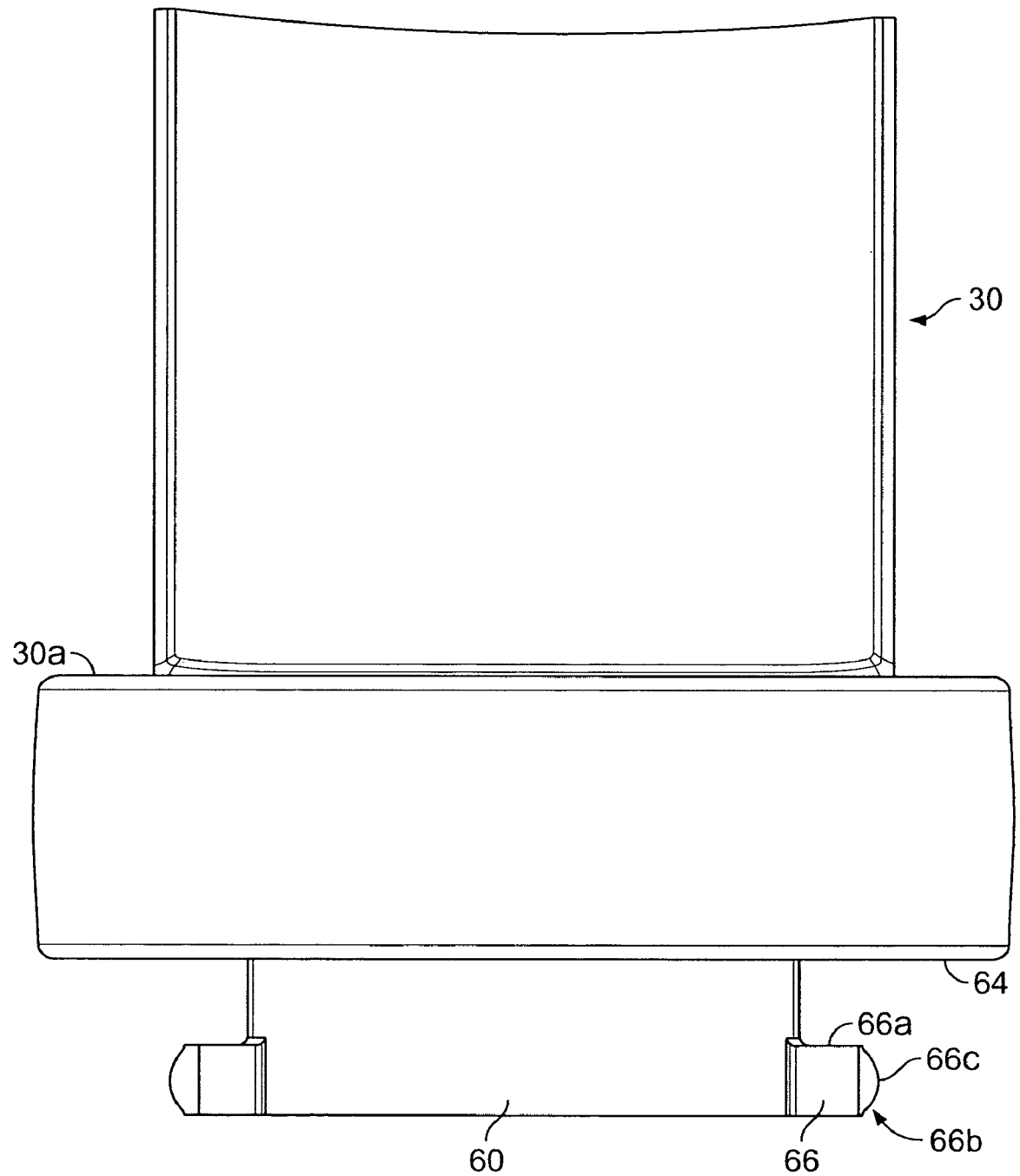
FIG. 10 is a front elevational view of the carrier portion of FIG. 9 showing carrier engagement structure for retaining the shield in the operational configuration.
Figure 11:
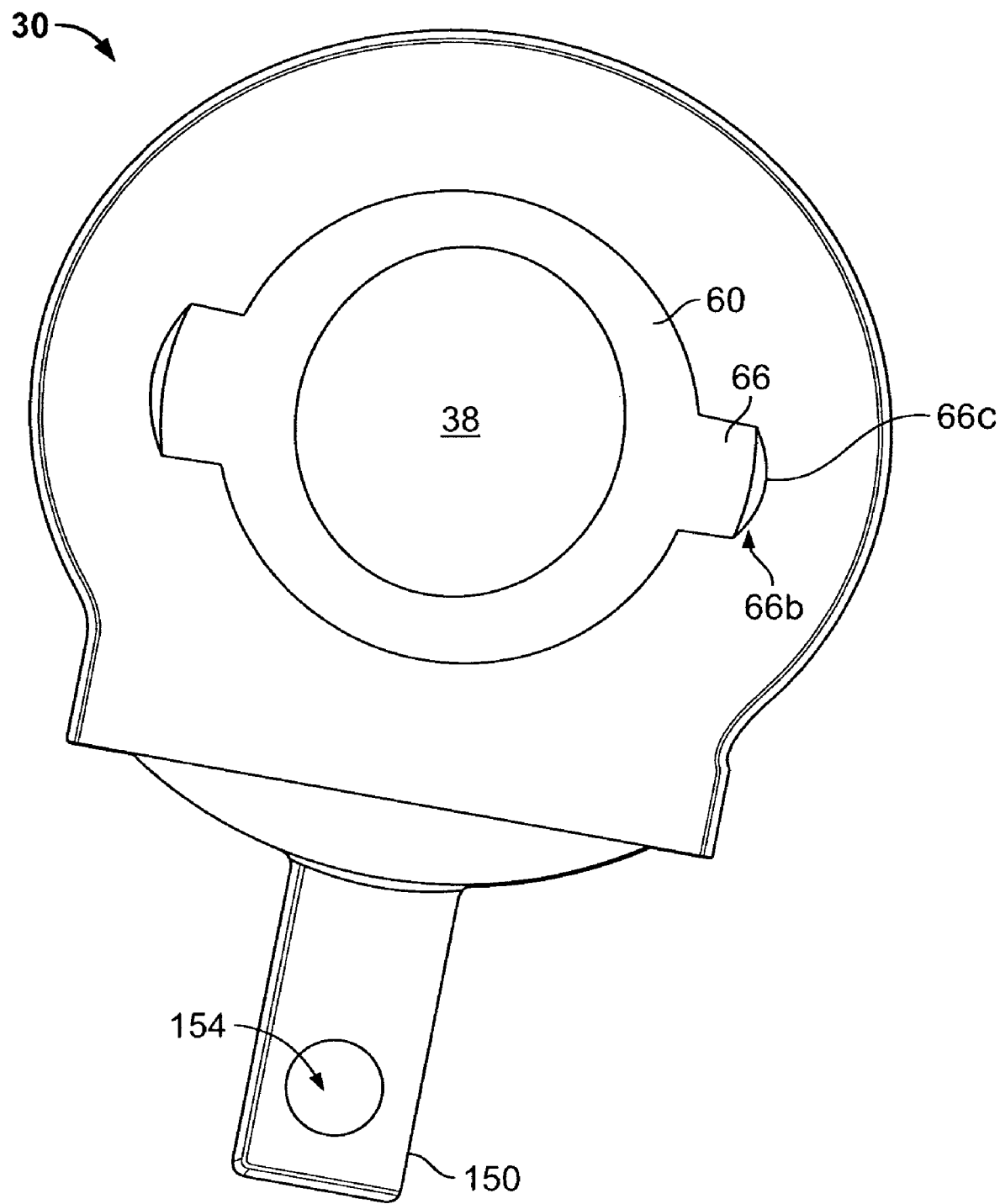
FIG. 11 is a bottom view of the carrier portion of FIG. 9 showing the carrier engagement structure.

To further retain the shield 20 with the carrier portion 30, a boss or detent 100 is formed on an interior of the shield 20. As best seen in FIG. 7, the detent 100 is formed on the inner surface 74 along the flat portion 96. Each tab 66 has a tip 66b with a rounded or arcuately-shaped radial surface 66c (see FIGS. 10 and 11), and the detent 100 has a similarly shaped surface 102. As the tab 66 and the shield 20 are rotated relative to each other, the tip surface 66c cams over the detent surface 102 with a slight amount of pressure or force. When fully secure with the shield 20, the tabs 66 are positioned against a trailing portion 102a (FIG. 7) of the detent surface 102 and a stop surface 104 formed on the wall 82. In this manner, the shield 20 and carrier portion 30 in essence snap together in a defined relative position for the operational configuration, and are removably affached for a storage or locked configuration discussed below.

Figure 1:
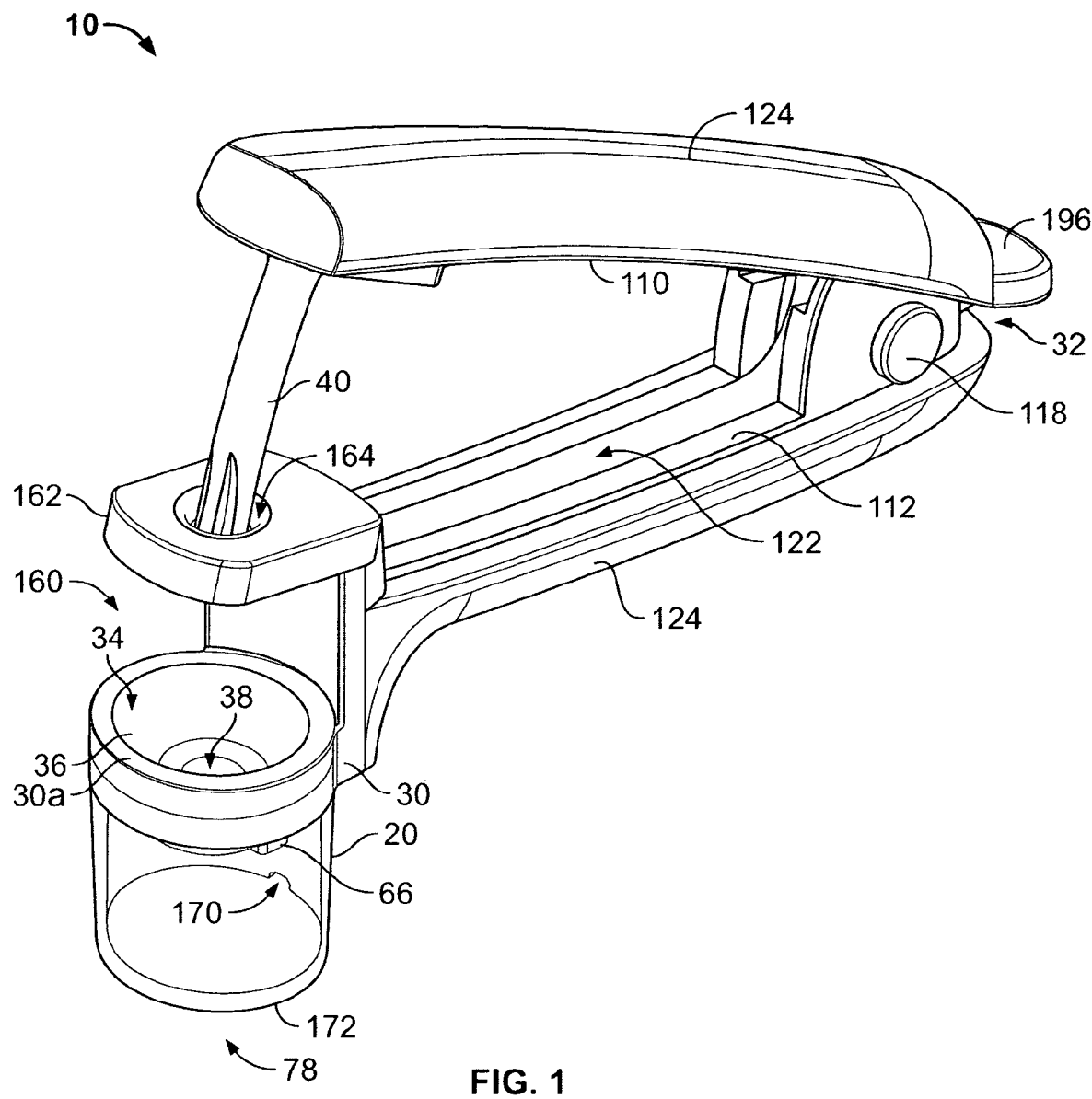
FIG. 1 is a perspective view of a device for removing a hard center of a food item from a comparatively soft portion of the food item, and a shield member removably attachable and storable with a carrier portion of the device for controlling splatter from the removal process.
Figure 2:
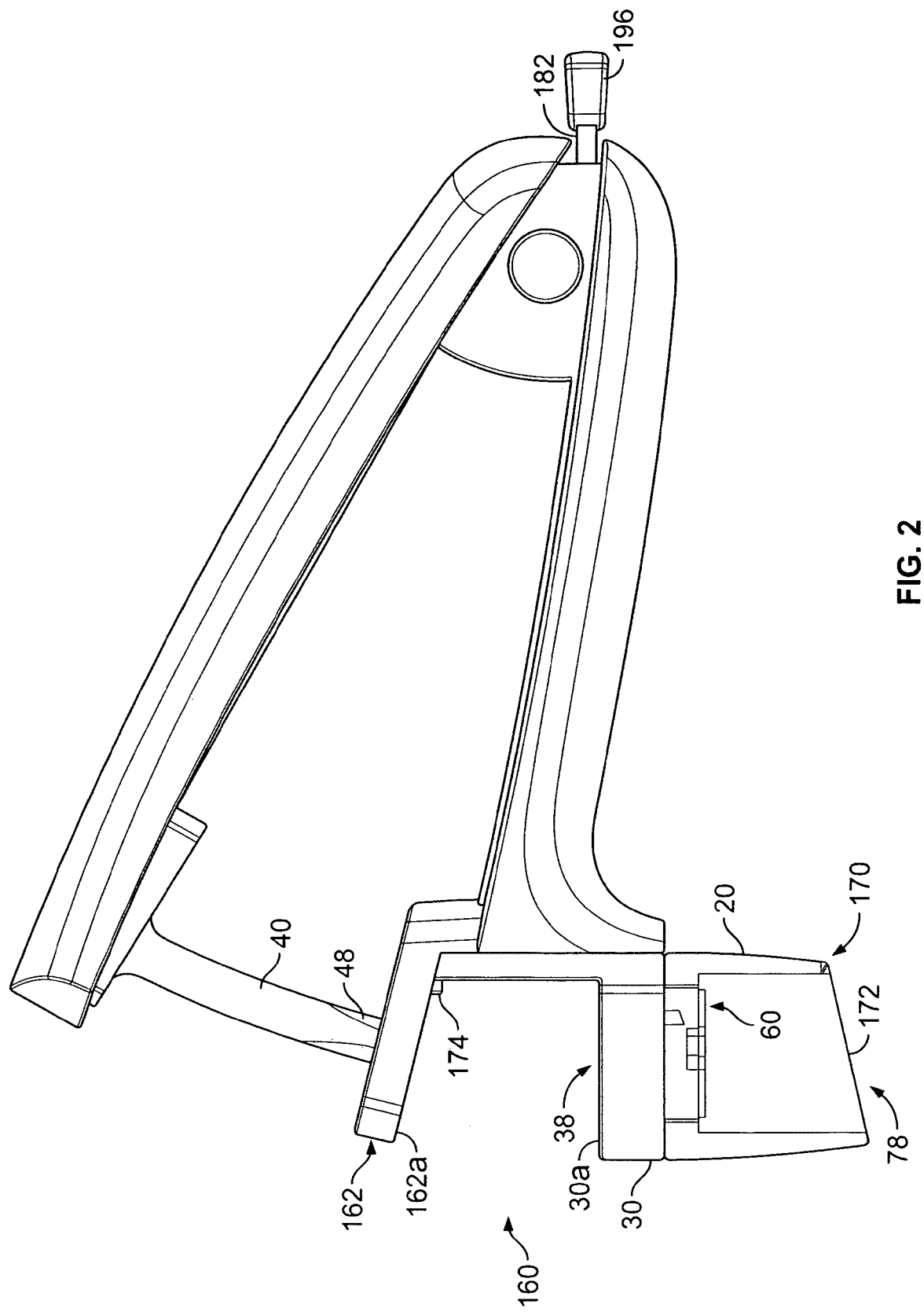
FIG. 2 is a side elevation view of the device and shield of FIG. 1 in an operational configuration.
Figure 3:
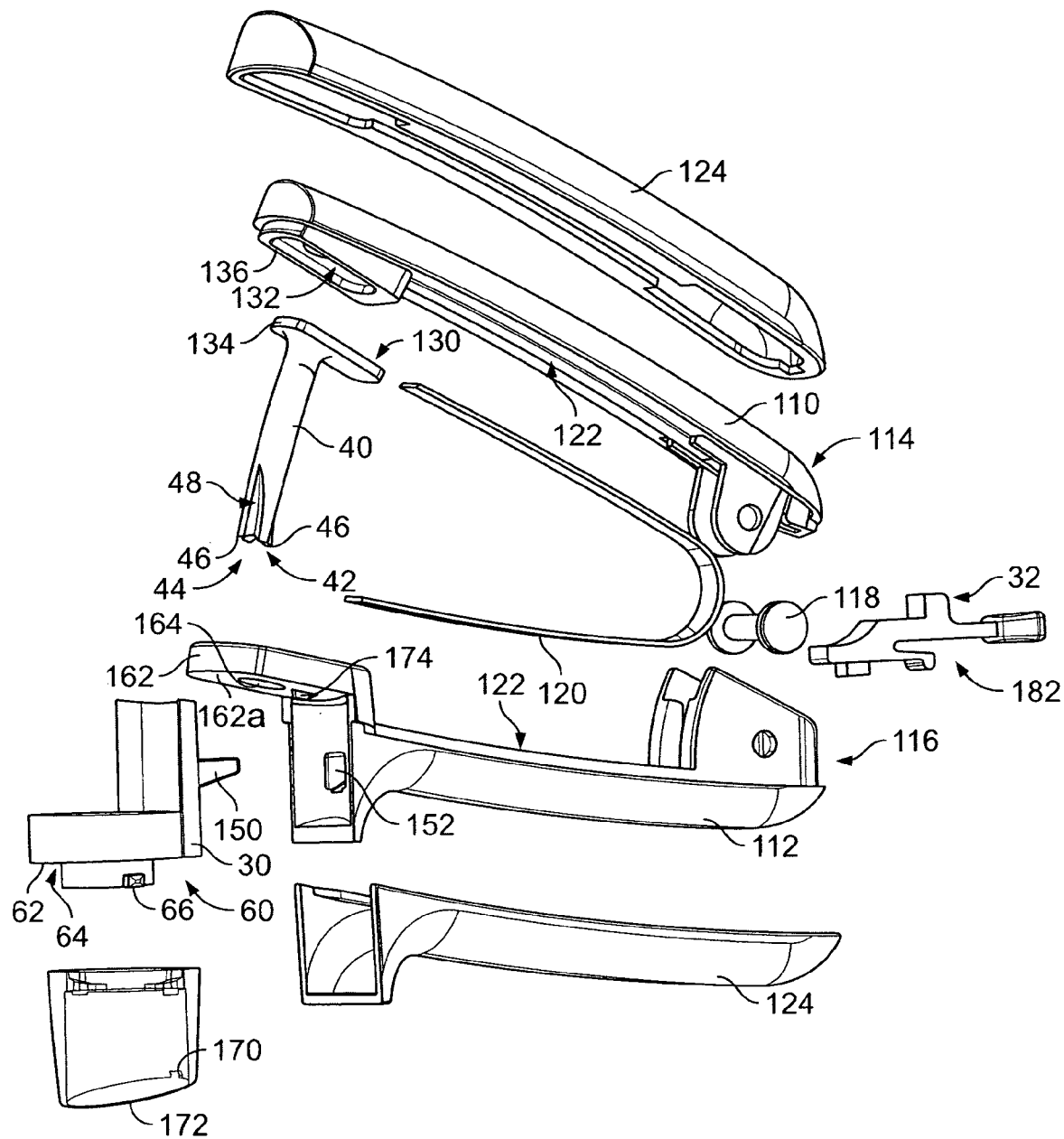
FIG. 3 is an exploded view of the device and shield of FIG. 1.

Turning now to FIGS. 1-3, the use of the utensil 10 and shield 20 in the operational configuration will be described. The utensil 10 includes upper and lower. handles 110, 112 for advancing the plunger 40 toward the carrier portion 30. The handles 110, 112 are pivotally attached at respective rear ends 114, 116 by a pivot pin 118. A bias member in the form of a leaf spring 120 is located between the handles 110, 112 so that the handles 110, 112 are biased to an open position. The handles 110, 112 are compressed in operation to compress the leaf spring 120 and to advance the plunger 40 through the food item located on the carrier portion seat surface 36 and to a closed position, which is generally the same position for the handles 110, 112 as shown for the locked configuration of the utensil 10 shown in FIG. 14. As can be seen in FIG. 4, each of the handles 110, 112 has a recess 122 for receiving a portion of the leaf spring 120 therein, and the bias of the leaf spring 120 serves to retain the leaf spring 120 between the handles 110, 112. Each of the handles 110, 112 further includes a relatively soft grip portion 124 for contact with a user's hand, the grip portions 124 preferably made of a rubber material or an elastomeric material such as Santoprene®. Generally, the upper handle 110 is a plunger handle having the plunger 40 thereon, and the lower handle 112 is a holder handle having the carrier portion 30 and its holding portion or receptacle 34 thereon.

As can be seen in FIGS. 3 and 4, the plunger 40 is slightly arcuate and has a base portion 130 received within a recess 132 of the upper handle 110. The base portion 130 is elongated and has side edges 134 received within walls 136 around the recess 132 so that the plunger 40 resists turning during operation. Preferably, the plunger 40 is secured with the handle 110 by having a portion of the plunger 40 molded within the handle 110. Alternatively, a fastener (not shown) may be provided for securing the plunger 40 with the handle 110, the fastener being located below the grip portion 124 so that a user's hand does not come into contact with the fastener.

The carrier portion 30 is secured with the lower handle 112, as can be seen in FIGS. 2-4. The carrier portion 30 includes an extension 150 (FIG. 3) closely received within a cavity 152 formed in the handle 112 to define the position and relative orientation of the carrier portion 30 with the handle 112. The extension 150 and handle 112 include respective throughbores 154, 156 (FIG. 4) through which a fastener (not shown), su(ch as a screw, may be inserted or threaded to secure the carrier portion 30 on the handle 112.

The utensil 10 defines a space 160 in which the food item is received for pitting in the operational configuration and in which the shield 20 is stored in the locked configuration, shown in FIG. 14. In the present embodiment, the lower handle 112 includes a guide portion 162 extending from the handle 112 above and at a distance from the carrier portion 30, the guide portion 162 and carrier portion 30 defining the space 160 therebetween. It should be noted that the guide portion 162 may, alternatively, be a part of the carrier portion 30 and/or the carrier portion 30 may be formed integral with the handle 112. The guide portion 162 has a central bore 164 allowing the plunger 40 to pass through during operation of the utensil 10.

In the storage configuration of FIG. 14, the shield 20 is located in the space 160 between the guide portion 162 and the carrier portion 30, and the guide portion 162 serves as a shield retainer. More specifically, the shield 20 is removed from the projection 60 of the carrier portion 30, and is rotated and inserted between the guide portion 162 and the carrier portion 30 so that the first side 90 of the wall 82 is abutting a top side or retainer surface 30a of the carrier portion 30, around the seat surface 36. The exit 78 of the passage 50 is oriented towards and against a bottom side 162a of the guide portion 162 so that the passage 50 is aligned with the guide central bore 164. To configure the utensil 10 and shield 20 in the locked configuration from the operational configuration, the handles 110, 112 are advanced toward each other to compress the leaf spring 120. This advances the plunger 40 through the guide portion bore 164 and through the passage 50 of the shield 20 located between the guide portion 162 and the carrier portion 30.

The utensil 10 and shield 20 are configured to provide a relative orientation when in the locked configuration. As can be seen in FIG. 14, the exit 78 of the cylindrical body 72 of the shield 20 is angled relative to the passage 50, and the bottom side 162a of the guide portion has a corresponding angle. In some forms, the shield body 72 and lower handle 112 and/or guide portion 162 may have cooperating structure providing a specific orientation for the shield 20 within the space 160. Towards this end, a notch 170 may be formed in an edge 172, the notch 170 receiving a tab 174 formed on the lower handle 112 and/or guide portion 162 when in the storage or locked configuration so that the shield 20 is inserted within the space 160, as an example and shown in FIG. 3.

Once the shield 20 is located in the space 160, the utensil 10 may be locked in the locked configuration of FIG. 14. Toward this end, the utensil 10 is provided with a locking mechanism, generally represented at 32. As can be seen in FIG. 4, the locking mechanism 32 is located proximate the rear ends 114, 116 of the handles 110, 112.

Figure 12:
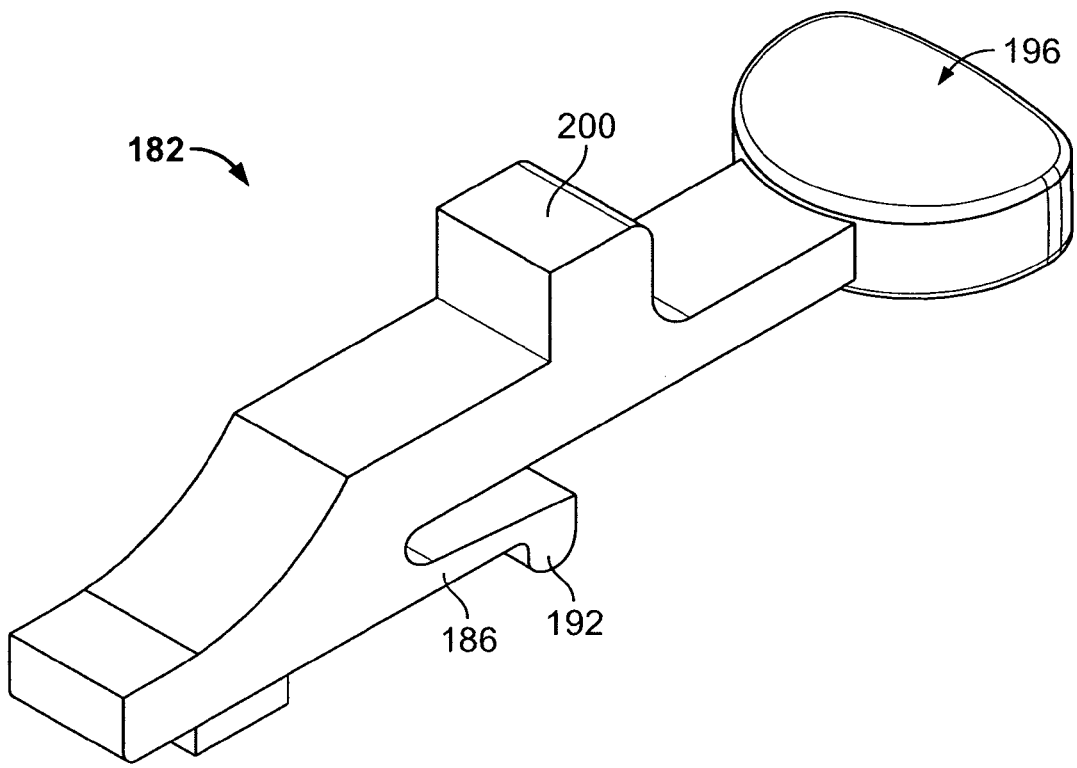
FIG. 12 is an enlarged perspective view of a locking slide of the lock mechanism of FIG. 4.
Figure 13:
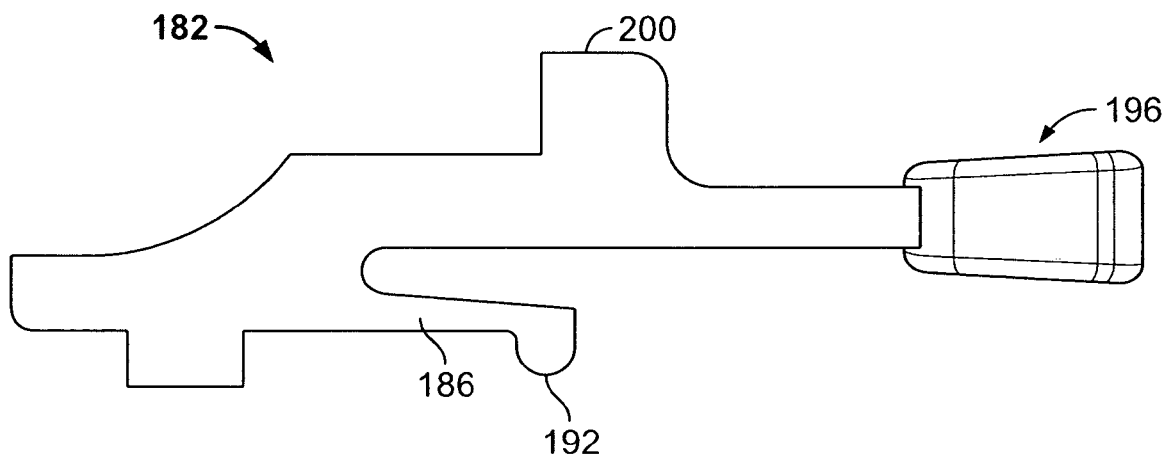
FIG. 13 is a side elevational view of the locking slide of FIG. 12.

In the present form, the locking mechanism 32 principally includes a locking member 182 (FIGS. 12 and 13) which cooperates with the upper and lower handles 110, 112. The locking member 182 has an unlocked position, shown in FIG. 4, corresponding to the operational configuration of the utensil 10 and shield 20. The locking member 182 also has a locked position, shown in FIG. 15, corresponding to the locked configuration of the utensil 10 and shield 20.

The lower handle 112 has a programmed surface 184 cooperating with a resiliently deflectable arm 186 formed on the locking member 182. The programmed surface 184 has a first recess 188 corresponding to the unlocked position and a second recess 190 corresponding to the locked position. That is, the arm 186 has a detent or finger 192 formed thereon and in confronting relationship with the programmed surface 184. The recesses 188, 190 are separated by a raised portion so that the finger 192 is deflected inwardly against its bias when the locking member 182 is shifted from the locked position, with the finger 192 in the second recess 190 (FIG. 15), to the unlocked position with the finger 192 in the first recess 188 (FIG. 4), or vice versa. A user grasps a finger grip 196 formed on a rearward end of the locking member 182 to push or pull the locking member 182 to and between the locked and unlocked positions.

Figure 15:
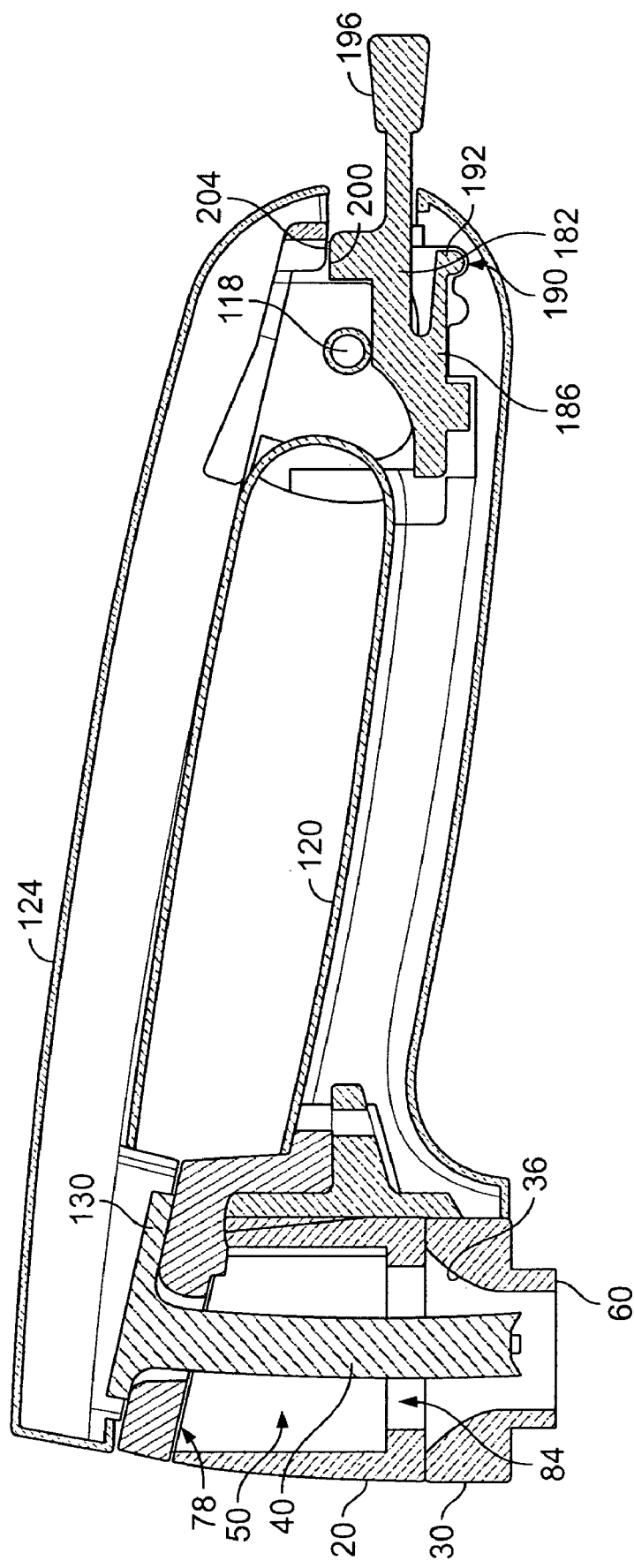
FIG. 15 is a cross-sectional view of the device and shield of FIG. 14.

The locking member 182 has a flat 200 formed on a top portion thereof for cooperating with the upper handle 110, specifically with a stop 204 formed on the upper handle 110, to lock the utensil 10 and shield 20 in the locked configuration. Notably, in the operational configuration shown in FIG. 4, the flat 200 is positioned in a forward location away from the stop 204. In the locked position, the locking member 182 is shifted rearward from the unlocked position so that the flat 200 abuts the stop 204 of the upper handle 110 with the handles 110, 112 compressed towards each other, as is shown in FIG. 15. Thus, the handles 110, 112 are prevented from pivoting around the pivot pin 118, and the bias of the leaf spring 120 is unable to move the handles 110, 112 to the open position for the utensil 10.

As described, the utensil 10 and shield 20 provide a device for removing a hard portion or pit from a food item where the shield 20 is easily removed for cleaning. Additionally, the utensil and shield 20 may be stored in a compact arrangement.

Figure 16:
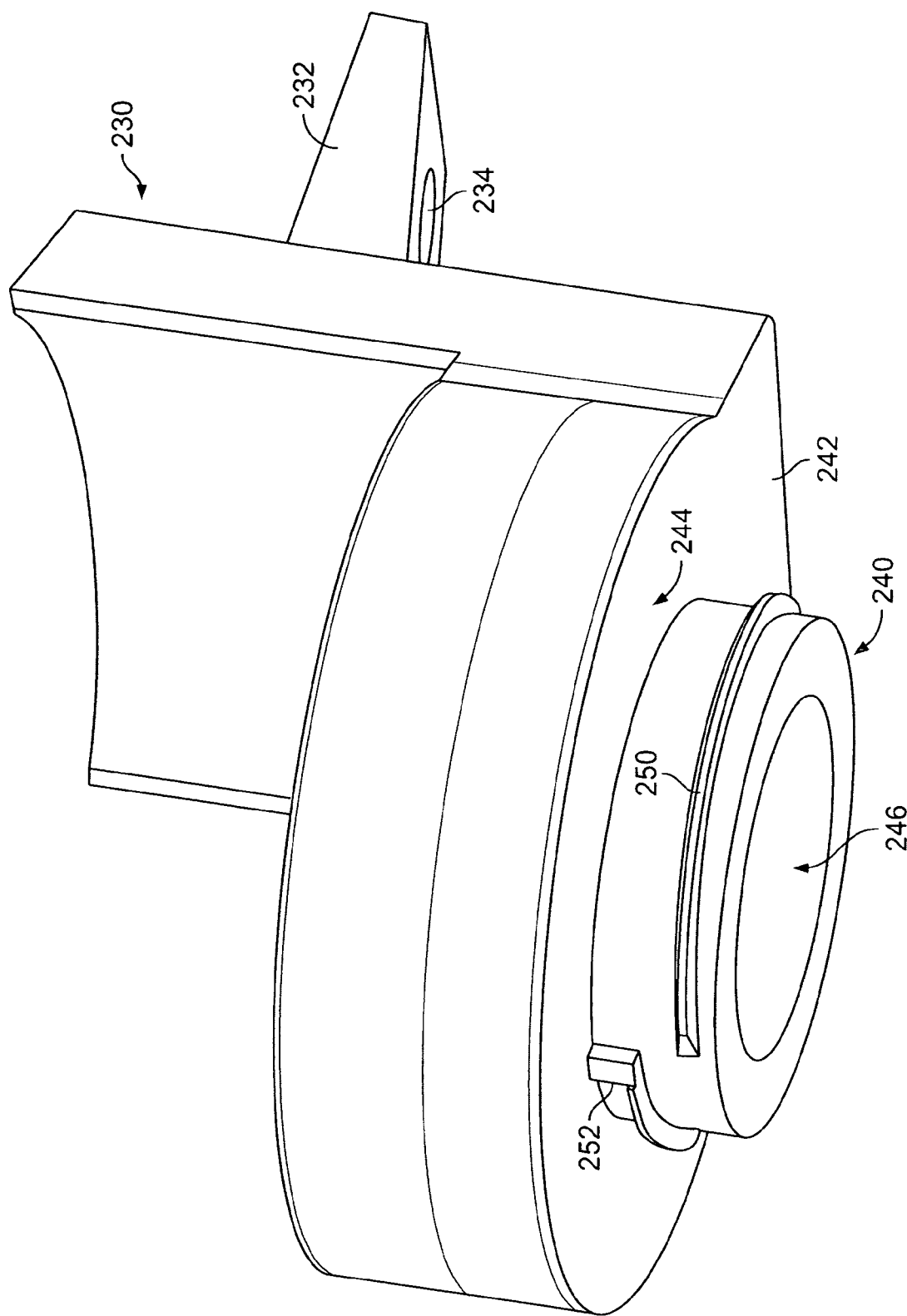
FIG. 16 is a perspective view of a second form of a carrier portion showing alternative carrier engagement structure for retaining a shield thereon in an operational configuration.
Figure 17:
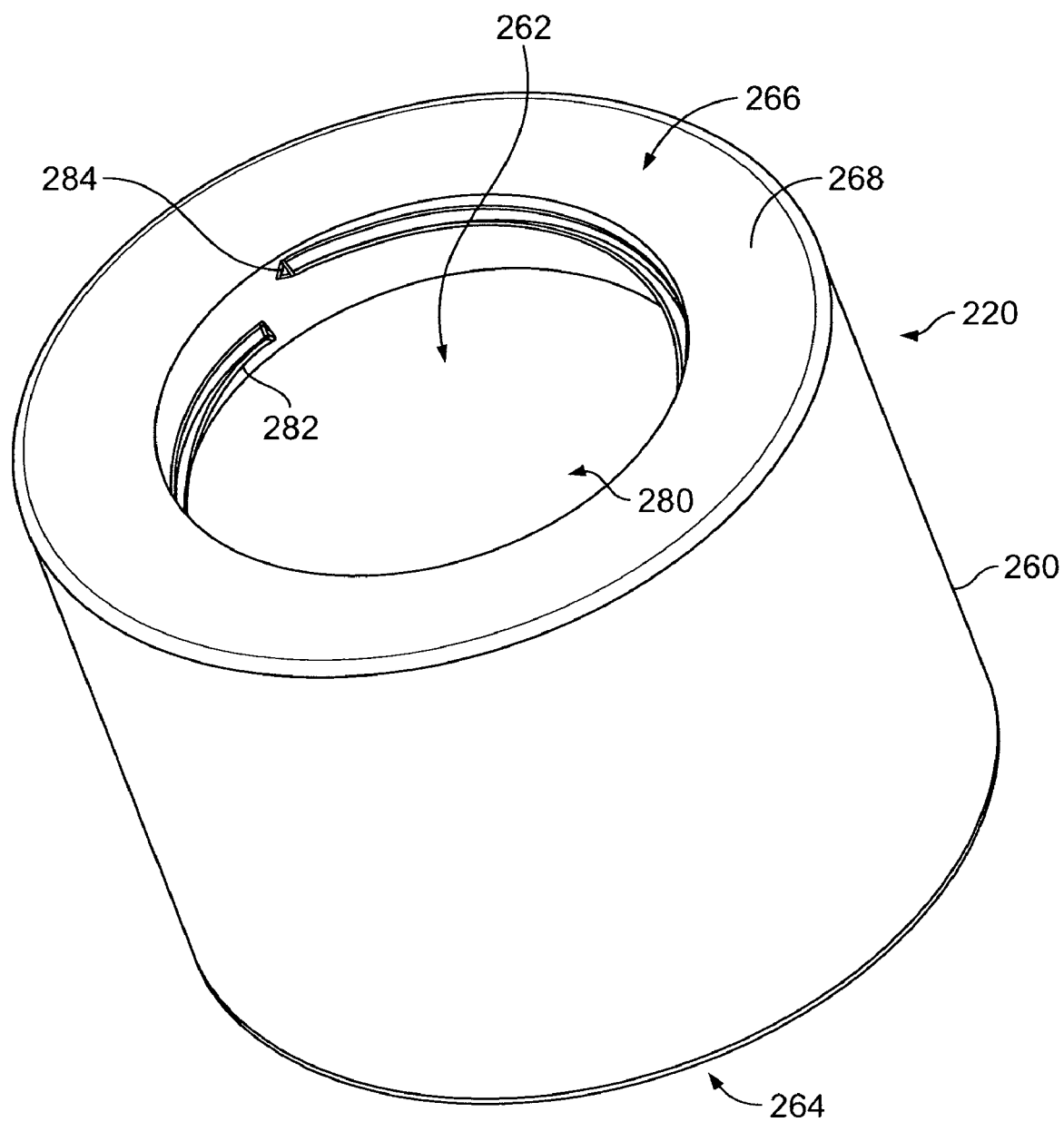
FIG. 17 is a perspective view of a second form of a shield showing alternative engagement structure for securing with the carrier portion of FIG. 16.

Turning now to FIGS. 16 and 17, alternative forms of a shield 220 and carrier portion 230 are depicted. As described, the shield 20 and carrier portion 30 have a push-and-turn or bayonet connection. In contrast, the shield 220 and carrier portion 230 have a threaded connection. As can be seen in FIG. 16, the carrier portion 230 includes an extension 232 for securing with the lower handle 112, and a bore 234 in the extension 232 for receiving a fastener (not shown) to secure the carrier portion 230.

The carrier portion 230 includes a projection 240 extending from a bottom side 242 of the carrier portion 230 so as to form a shoulder 244 on the bottom side 242. The projection 240 is generally cylindrical having a throughbore 246 allowing expulsion of the food item pit therethrough. The projection 240 further has an external thread 250 formed thereon, terminating at a stop 252 defining the amount of receipt of the projection 240 within the shield 220.

With reference to FIG. 17, the shield 220 has a cylindrical body 260 defining a passage 262 and controlling splatter from a food item through an exit 264, and a transverse wall 266 located opposite the exit 264. The transverse wall 266 has a top surface 268 which, when secured with the carrier portion 230 in the operational configuration, abuts the shoulder 244 and bottom side 242. It should be noted that the cylindrical body 260 is generally configured identically to the cylindrical body 72 of the shield 20 so that it is receivable in the space 160 in the same manner as the shield 20.

The wall 266 has a bore 280 formed therein with internal threads 282 which threadably engage with the threads 250 of the carrier portion 230. The shield threads 282 include a thread end 284 which abuts the carrier portion thread stop 252 when fully received therewith.

While the invention has been described with respect to specific examples including presently preferred modes of carrying out the invention, those skilled in the art will appreciate that there are numerous variations and permutations of the above described systems and techniques that fall within the spirit and scope of the invention as set forth herein.

What is claimed is:

1. In combination:
    a kitchen utensil for removing a central hard portion from an outer soft portion of a food item, the utensil including,
        a holding portion for holding the food item in a placing position for removal of the hard portion, and
        a plunger drivable from a first side of the placing position through the soft portion and into contact with the hard portion to expel the hard portion from the soft portion while the food item is in the placing position;
    a shield member removably securable with the kitchen utensil proximate a second side of the placing position generally opposite from the first side and extending away from the placing position to control debris resulting from removal of the hard portion, the shield member being releasably securable with the kitchen utensil in a use configuration for use in removal of the hard portion, and the shield member being storable with the kitchen utensil in a storage configuration when the kitchen utensil is not in use;
    a shield retainer for storing the shield member in the storage configuration;
    a plunger handle extending from the plunger;
    a holder handle coupled to the holding portion; and
    structure pivotally interconnecting the plunger handle and the holder handle to permit the plunger to move towards and away from the holding portion to drive the plunger into the food item,
    whereby in the storage configuration the shield member is positioned between the shield retainer and the holding portion, and the plunger handle and the holder handle are pivoted toward each other so that the plunger extends through the shield member to retain the shield member with the kitchen utensil.

2. The combination of claim 1 further including a lock mechanism, the lock mechanism locking the kitchen utensil in the storage configuration, wherein the plunger extends into the placing position.

3. The combination of claim 1 further including grip portions on the plunger handle and the holder handle of the kitchen utensil, the grip portions formed of soft resilient material.

4. In combination:
a kitchen utensil for removing a central hard portion from an outer soft portion of a food item, the utensil including,
a holding portion for holding the food item in a placing position for removal of the hard portion, and
a plunger drivable from a first side of the placing position through the soft portion and into contact with the hard portion to expel the hard portion from the soft portion while the food item is in the placing position;
a shield member removably securable with the kitchen utensil proximate a second side of the placing position generally opposite from the first side and extending away from the placing position to control debris resulting from removal of the hard portion, the shield member being releasably securable with the kitchen utensil in a use configuration for use in removal of the hard portion, and the shield member being storable with the kitchen utensil in a storage configuration when the kitchen utensil is not in use; and
a shield retainer for storing the shield member in the storage configuration, wherein the shield retainer is positioned to provide a storage space between the shield retainer and the holding portion, the shield member being located in the storage space in the storage configuration.

5. The combination of claim 4 wherein the holding portion includes a cup-like surface having a generally central hole through which the hard portion is expelled.

6. The combination of claim 4 wherein the plunger is an elongated rod-like member.

7. The combination of claim 6 wherein the rod-like member has a leading portion with structure for piercing the soft portion of the food item.

8. The combination of claim 4 wherein the kitchen utensil has retention structure cooperable with the shield member to releasably secure the shield member in the use configuration.

9. The combination of claim 8 wherein the retention structure includes threads, and the shield member includes mating threads permitting the shield member to be threadably connected with the kitchen utensil.

10. The combination of claim 4 wherein the kitchen utensil and the shield member are releasably securable in the use configuration with a bayonet connection.

11. The combination of claim 4 wherein the shield retainer has a retainer surface against which the shield member is located in the storage configuration, the retainer surface generally facing the holding portion.

12. The combination of claim 11 wherein the retainer surface is located substantially between the plunger and the holding portion.

13. The combination of claim 4 wherein the kitchen utensil and the shield member have respective structures which mate when the shield member is in the storage configuration.

* * * * *